Figure 1:
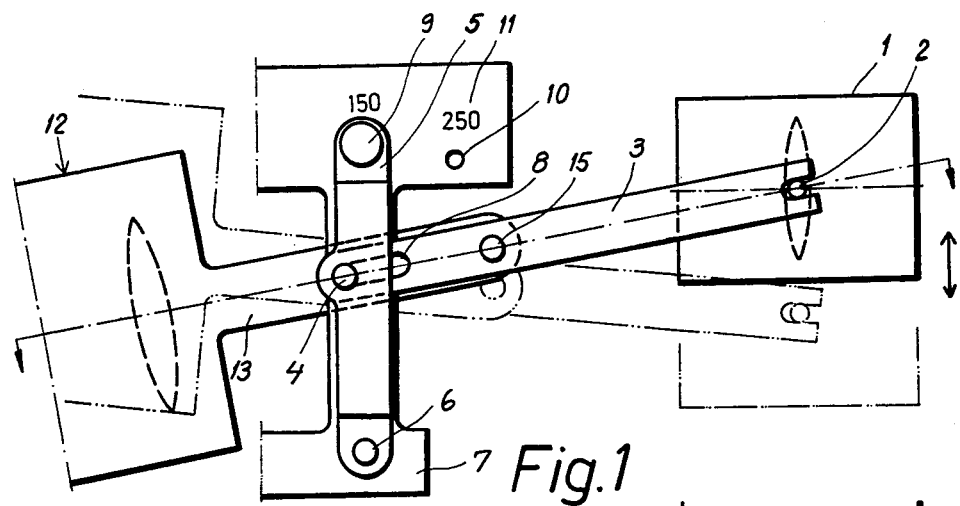

United States Patent [19]

Johansson

[11] Patent Number: 4,482,224
[45] Date of Patent: Nov. 13, 1984

[54] COMPENSATION DEVICE AT PROJECTORS WITH EXCHANGEABLE AND VERTICALLY MOVABLE LENSES

[75] Inventor: Kent A. Johansson, Angered, Sweden

[73] Assignee: Victor Hasselblad Aktie Bolag, Gothenburg, Sweden

[21] Appl. No.: 536,755

[22] Filed: Sep. 28, 1983

[30] Foreign Application Priority Data

Oct. 4, 1982 [SE] Sweden ............................ 8205639

[51] Int. Cl.³ ............................................. G03B 21/00
[52] U.S. Cl. ..................................... 353/101; 353/70
[58] Field of Search ................. 353/100, 101, 69, 70; 352/93, 94, 140, 105; 355/52; 350/247

[56] References Cited

U.S. PATENT DOCUMENTS

| 1,952,522 | 3/1932 | Warmisham | 353/70 |
| 1,954,876 | 4/1933 | Joannides | 353/101 |
| 2,679,784 | 6/1954 | Simmon | 353/101 |
| 3,963,337 | 6/1976 | Lundberg | 353/101 |

*Primary Examiner*—Charles Frankfort
*Assistant Examiner*—Thomas P. Matecki
*Attorney, Agent, or Firm*—Sherman & Shalloway

[57] ABSTRACT

This invention relates to a device at projectors, which are provided with a lens barrel (1) vertically movable perpendicularly to the optic axis of the lens, and with a lighting arrangement (12), which is mounted rotatably and coupled via one or several hinged arms to the moving means for the lens barrel, so that optimum lighting through the slide to the lens is obtained. According to the invention, the hinged arm comprises two co-operating portions, a lens arm (3) and a lighting arm (13). The lens arm extends from a guide pin (2) on the lens barrel rearward to the slide plane where it is hingedly united with a sector arm (5). The joint (4) between the lens arm (3) and sector arm (5) is rigidly connected to the sector arm and in the lens arm (3) movable in a groove (8). The lighting arm extends from the lighting arrangement (12) forward to and a distance past the slide plane. In the slide plane the lighting arm is pivotally mounted in a joint (4) attached on the projector chassis. At its forward end pointing to the lens barrel, the lighting arm (13) is hingedly connected to the lens arm (3). By changing the position of the joint (4) between the sector arm (5) and lens arm (3) in the groove (8), a change in the transmission ratio between the movements of the lens arm (3) and lighting arm (13) is obtained, so that upon vertical movement of the lens barrel the light from the lighting arrangement (12) through the slide enters at different angles the lens, adjusted to the position of its focal plane and entrance pupil.

3 Claims, 4 Drawing Figures

U.S. Patent

Nov. 13, 1984

4,482,224

COMPENSATION DEVICE AT PROJECTORS WITH EXCHANGEABLE AND VERTICALLY MOVABLE LENSES

This invention relates to a device for use with projectors, preferably slide projectors which are provided with a lens barrel, which in operative position of the projector preferably is movable vertically and perpendicularly to the optical axis of the associated lens, and with a lighting arrangement, which is mounted rotatably about an imaginary axis and located in the plane of the upright slide and in operative position horizontally, for optimum lighting through the slide to the focal plane of the lens, the respective lens barrel and lighting arrangement being mechanically coupled to each other via at least one articulated arm mechanism, the center of rotation of which is located in the aforesaid imaginary axis in the slide plane.

When slides are projected on a projecting screen, it can be observed that the edges of the image are often not in parallel, although the original slide is square or rectangular, and the slide plane is flat. This phenomenon is called the Keystone-effect and is due to the fact that the light of the projector enters the screen obliquely, and that the axis of the lens and the main normal are not in parallel. This can be compensated for by a device of the kind described hereinabove in the introductory portion. A prerequisite is that the angular field of the lens is greater than that of the slide to be projected.

Problems, however, can arise when several lenses are associated with the projector, and the focal planes of these lenses in operative position in the projector do not have the same distance from the slide. It is important, that the lighting arrangement lights through the slide straight to the focal plane of the lens, because otherwise the light yield is worse on the whole and, besides, different parts of the slide can be lighted with different strengths.

The present invention has the object to eliminate the aforesaid problem, so that the lighting arrangement in every operational situation can be given optimum alignment corresponding to the position for the focal plane of the lens selected at the occasion.

The invention, for this purpose, is characterized in that the articulated arm comprises two co-operating portions, to wit a front portion hingedly connected to the mounting of the lens, i.e. the lens arm, and a rear portion rigidly connected to the lighting arrangement, i.e. the lighting arm, that the lens arm extends at least substantially rearward to the pivot axis in the slide plane, that the lighting arm extends ahead of said pivot axis a distance to the lens barrel and is hingedly mounted at a fixed first joint located on the aforementioned imaginary pivot axis in the slide plane, that the lens arm and the lighting arm are hingedly connected via a second joint at the forward end of the lighting arm. That the lens arm is hingedly connected via a third rear joint to a sector arm, which is pivotal about a fixed fourth joint located to the side of, preferably below the first joint for the lighting arm, and that the rear third joint of the lens arm, by rotation of the sector arm about the fixed fourth joint, is movable along a groove located in the lens arm so designed that through the mechanical coupling between the lens arm and lighting arm, the lighting arrangement, in response to the position of the sector arm, is caused to assume positions corresponding to different positions of the focal plane of the selected lens.

In an embodiment of the invention, the projector is provided with marked positions for the sector arm corresponding to different positions of the focal plane of different lenses, and the sector arm is easily adjustable as it extends above the lens arm and lighting arm.

Figure 2:
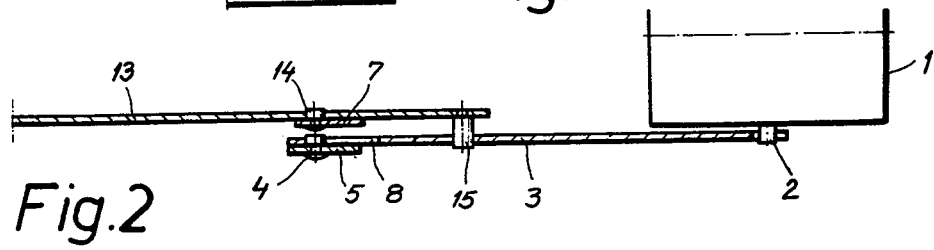
Figure 3:
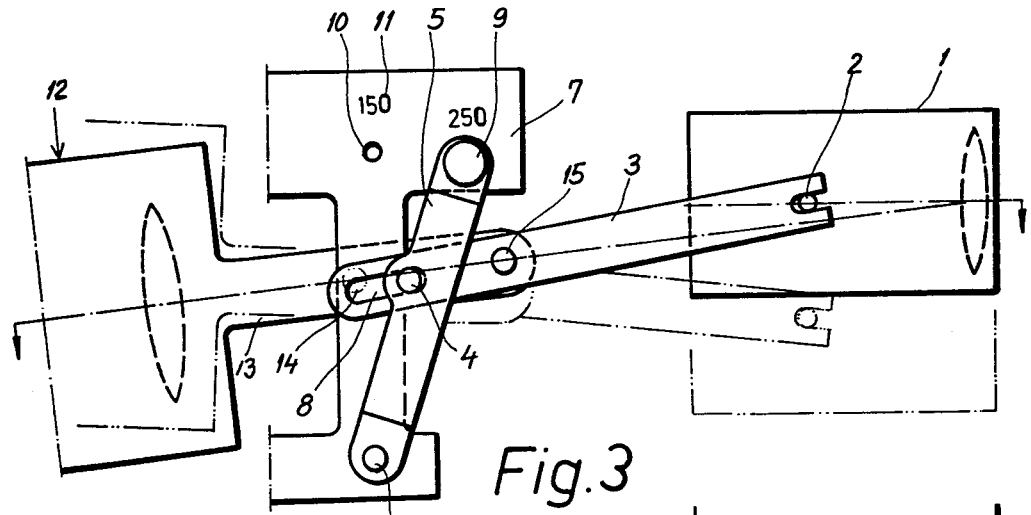
Figure 4:
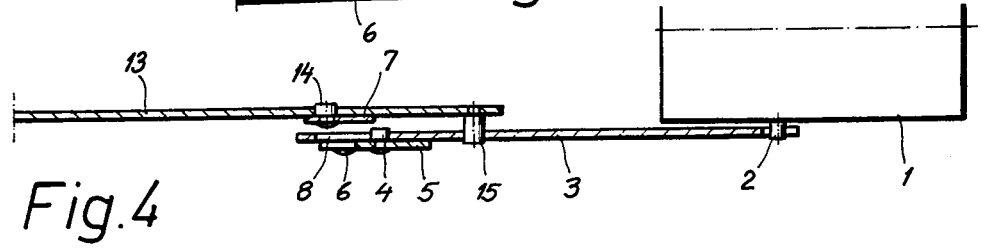

The invention is described in greater detail in the following specification and explained with reference to an embodiment illustrated in the accompanying drawing figure, in which FIG. 1 is a lateral view of a schematically shown articulated arm system according to the invention, where the sector arm is in an extreme position corresponding to a case, in which the effect of the articulated arm portions is equivalent with a single integer hinged arm, FIG. 2 is a section through the articulated arm system in FIG. 1, seen from above, FIG. 3 and FIG. 4 correspond to FIG. 1 and, respectively FIG. 2, but with the sector arm in the other extreme position.

As shown in FIG. 1, the device according to the invention, comprises a lens barrel 1 intended to receive one of several lenses (not shown) fitting the projector. The lens barrel 1 is vertically movable perpendicularly to its axis in known manner by means (not shown). On one side of the lens barrel 1 a guide pin 2 is provided, which engages with one end of a lens arm 3, the other end of which is mounted in a joint 4 attached on a sector arm 5. The sector arm 5 is hingedly mounted in a joint 6 attached to a portion of the projector chassis 7 (shown only schematically). The lens arm 3 is provided with a groove 8, in which the joint 4 can be moved upon rotation of the sector arm 5. The rotation angle of the sector arm 5 is restricted by the end positions of the joint 4 in the groove 8. As shown, the groove 8 is substantially straight, but, if desired, may be made arcuate. For being comfortably accessible and simply adjustable, the sector arm 5 is designed so that it extends a distance above the mounting of the joint 4 and the lens arm 1. At its upper end, the sector arm 5 is provided with a locking screw 9, which is adapted to engage with position indications 10 corresponding to different focal plane positions of the respective lenses. In FIG. 1 these positions are marked by focal length numerals 11. In the rear end position of the sector arm 5, farthest away from the lens, the joint 4 is located aligned with an imaginary axis extending through the centre of the slide to be projected and in plane therewith. From a lighting arrangement 12 behind the slide plane, a lighting arm 13 extends forward to the lens through a distance past the imaginary axis in the slide plane. Flushing with the axis, the lighting arm 13 is hingedly mounted at a fixed joint 14 located on the chassis portion 7. The lighting arm 13 further is hingedly connected, at its forward end located closest to the lens barrel 1, to the lens arm 3 via a joint 15.

When the sector arm 5 is in the position at the rear one of the position markings 10 as shown in FIG. 1, where the joints 4 and 14 are located coaxially as shown in FIG. 2 the lens arm 3 and lighting arm 13 act together as if they were one single rigid arm, that is, when the lens barrel 1 via its mechanism (not shown) is moved upward so that the lens arm forms a certain angle with the horizontal line through the joint 4, the lighting arm is caused via the joint 15 to form the same angle with the said horizontal line. The lighting arrangement thereby is directed through the slide plane, along the arms 3 and 13. In view thereof, the lens barrel 1 is designed so that a normal lens with the focal length 150 mm positioned in operative position has its focal plane just where the lighting meets, that is in this case on the same level as the guide pin 2. When the vertical position of the lens barrel is being adjusted, the lighting arrangement follows along, and the lighting is at optimum in all positions.

When the conditions require a different lens, for example with a greater focal length, say 250 mm, this lens cannot for practical reasons be placed with its focal plane in the same place, but is farther away from the slide. Therefore, with the aforesaid setting of the lighting arrangement 12, its alignment is incorrect in relation to the entrance pupil and focal plane of the lens. According to the invention, however, as shown in FIG. 3, this can be corrected in that the sector arm 5 is moved ahead to the position "250", that is, the locking screw 9 is fixed in the forward position marking 10. The joint 4 thereby assumes its forward position in the groove 8. As this mechanically implies that the end of the lens arm 3 remote from the lens barrel 1 is moved downward while the end co-operating with the guide pin 2 only rotates about the pin 2, the consequence of this is that the forward end of the lighting arm 13 is moved downward, and the lighting arrangement 12 to a corresponding degree is pivoted upward on the other side of the joint 14, and the surface lightened at optimum is located further ahead, to wit, in the focal plane of the selected lens.

The invention is not restricted to the embodiment described above and illustrated in the drawing, as many modifications are possible within the scope of the attached claims without straying from the preview of the present invention. The joint 6, for example, of the sector arm 5 can be located above the arms 3 and 13, and in a corresponding way the locking screw 9 with markings 10 below the same. The groove 8, further, may have a design which renders possible adjustment for more than two different focal plane positions, none of which necessarily must align the joint 4 with the joint 14. The mechanism, of course, may be a double one, i.e. one pair of arms on each side of the lens barrel and slide. The arms do not have to be straight, either, and their form can be adjusted to other mechanical elements about them. The markings 10 can be formed in several different ways, for example as holes or depressions or only as painted points. It also can be possible for the lens barrel to be movable, also, in a lateral direction.

What I claim is:

1. A device for use in a projector, preferably a slide projector, provided with a lens barrel, which in operative position of the projector is preferably movable vertically and perpendicularly to the optical axis of an associated selected lens, and with a lighting arrangement, which is mounted rotatably about an imaginary axis located in the plane of an upright slide located in said projector and in operative position for optimum lighting through the slide to a focal plane of the selected lens, the respective lens barrel and lighting arrangement being mechanically coupled to each other via at least one articulated arm mechanism having a center of rotation on said imaginary axis in the slide plane, characterized in that the articulated arm mechanism comprises two co-operating portions, a front portion including a lens arm hingedly connected to structure mounting said selected lens to said projector, and a rear portion including a lighting arm rigidly connected to the lighting arrangement, said lighting arm connected to the lens arm that extends at least substantially rearward to said imaginary axis in the slide plane, the lighting arm extending ahead of said imaginary axis a distance to the lens barrel and being hingedly mounted at a fixed first joint located on the aforementioned imaginary axis in the slide plane, the lens arm and lighting arm being hingedly connected via a second joint at a forward end of the lighting arm, the lens arm being hingedly connected via a third rear joint to a sector arm which is pivotal about a fourth fixed joint located to the side of and preferably below the first joint for the lighting arm, and that the rear, third joint of the lens arm, by rotation of the sector arm about its fixed fourth joint, is movable along a groove located in the lens arm such that by the mechanical coupling between the lens arm and lighting arm, the lighting arrangement, in response to the position of the sector arm, is caused to assume positions corresponding to different positions of the focal plane of the selected lens.

2. A device as defined in claim 1, characterized in that the groove in the lens arm extends substantially along the lens arm, and that the position and form of the groove are adjusted so that by rotation of the sector arm between marked positions, the third joint which comprises the pivot axis for the lens arm, via the lens arm and via the second joint causes the lighting arm to move the lighting arrangement to a suitable position corresponding to an optimum lighting of the slide in the direction of the outer focal plane of the selected lens relative to the respective marked position.

3. A device as defined in claim 1 or 2, characterized in that the sector arm extends above the third joint for the lens arm and that the sector arm is provided at its upper end with a locking member capable of engaging with fixed marked positions corresponding to a suitable alignment of the lighting arrangement through the slide to the focal plane of the selected lens.

* * * * *